(12) United States Patent
Jeffryes et al.

(10) Patent No.: US 11,773,710 B2
(45) Date of Patent: Oct. 3, 2023

(54) SYSTEMS AND METHODS TO DETERMINE ROTATIONAL OSCILLATION OF A DRILL STRING

(71) Applicant: SCHLUMBERGER TECHNOLOGY CORPORATION, Sugar Land, TX (US)

(72) Inventors: Benjamin Peter Jeffryes, Cambridge (GB); Adam Ian Bowler, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 786 days.

(21) Appl. No.: 16/194,028

(22) Filed: Nov. 16, 2018

(65) Prior Publication Data

US 2020/0157930 A1    May 21, 2020

(51) Int. Cl.
*E21B 44/02* (2006.01)
*G01H 1/10* (2006.01)
*E21B 21/08* (2006.01)
*E21B 47/007* (2012.01)

(52) U.S. Cl.
CPC ........... *E21B 44/02* (2013.01); *E21B 21/08* (2013.01); *E21B 47/007* (2020.05); *G01H 1/10* (2013.01)

(58) Field of Classification Search
CPC ......... E21B 44/02; E21B 47/007; E21B 21/08
See application file for complete search history.

(56) References Cited

U.S. PATENT DOCUMENTS

| | | | | |
|---|---|---|---|---|
| 5,864,058 A | * | 1/1999 | Chen | E21B 47/00 73/152.47 |
| 6,142,228 A | * | 11/2000 | Jogi | E21B 4/02 367/75 |
| 10,746,013 B2 | * | 8/2020 | Hohl | F04C 2/107 |
| 11,525,321 B2 | * | 12/2022 | Matheus Valero | E21B 19/008 |
| 2005/0060096 A1 | * | 3/2005 | Hutchinson | E21B 44/00 702/6 |

(Continued)

FOREIGN PATENT DOCUMENTS

| | | |
|---|---|---|
| EP | 2169176 A2 | 3/2010 |
| WO | 2011035280 A2 | 3/2011 |
| WO | 2015066465 A1 | 5/2015 |

OTHER PUBLICATIONS

Combined Search and Examination Report under Sections 17 and 18(3) in UK Patent Application No. 1916685.9, dated Jul. 2, 2020, 9 pages.

*Primary Examiner* — Blake Michener
*Assistant Examiner* — Neel Girish Patel
(74) *Attorney, Agent, or Firm* — Jeffrey D. Frantz

(57) ABSTRACT

Embodiments of the present disclosure relate to a tangible, non-transitory, computer-readable medium that stores instructions executable by one or more processors, in which the instructions cause the one or more processors to determine a threshold value associated with an axial acceleration oscillation amplitude at a drill bit, in which the drill bit is a part of a drilling system. The instructions further cause the one or more processors to receive an operating parameter value of the drilling system, compare the operating parameter value with the threshold value, and adjust an operation of the drilling system in response to comparing the operating parameter value with the threshold value.

19 Claims, 5 Drawing Sheets

(56) References Cited

U.S. PATENT DOCUMENTS

| | | | |
|---|---|---|---|
| 2013/0049981 A1* | 2/2013 | MacPherson | E21B 44/00 340/853.1 |
| 2013/0341091 A1* | 12/2013 | Sugiura | E21B 45/00 175/24 |
| 2014/0129148 A1* | 5/2014 | Harmer | E21B 47/024 702/9 |
| 2014/0151122 A1* | 6/2014 | Venugopal | E21B 47/017 175/40 |
| 2015/0083492 A1 | 3/2015 | Wassell | |
| 2015/0122547 A1* | 5/2015 | Hohl | E21B 44/02 175/40 |
| 2015/0167392 A1* | 6/2015 | Sugiura | E21B 7/04 175/45 |
| 2015/0308203 A1* | 10/2015 | Lewis | E21B 47/06 175/48 |
| 2016/0348493 A1* | 12/2016 | Hohl | E21B 21/08 |
| 2018/0258750 A1* | 9/2018 | Hadi | E21B 7/04 |
| 2020/0072045 A1* | 3/2020 | Bramlage | H05K 1/183 |
| 2020/0080409 A1* | 3/2020 | Haggerty | E21B 7/04 |
| 2020/0263534 A1* | 8/2020 | Young | E21B 47/0228 |

\* cited by examiner

SYSTEMS AND METHODS TO DETERMINE ROTATIONAL OSCILLATION OF A DRILL STRING

BACKGROUND

This disclosure relates generally to downhole drilling systems and, more particularly, to controlling operation of a drill string based on rotational movement of the drill string.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Oil and gas industry processes include exploration, drilling, logging, extraction, transportation, refinement, retail, and so forth, of natural resources, such as oil, gas, and water. The natural resources may be located underground and, as such, a drilling system may be used to perform some of the processes. For example, the drilling system may form boreholes into the ground to discover, observe, analyze, and/or extract the natural resources.

However, it is now recognized that, when drilling, high frequency rotational oscillations may occur, which generate large torsional stresses on near-bit drilling components that can result in structural failure. In some circumstances, such as when drilling with a positive displacement motor, these high frequency rotational oscillations may be difficult to detect directly, especially when there is no suitable measurement instrumentation disposed below the motor of the drill string—as the oscillations are localized below the positive displacement motor.

SUMMARY

A summary of certain embodiments disclosed herein is set forth below. It should be understood that these aspects are presented merely to provide the reader with a brief summary of these certain embodiments and that these aspects are not intended to limit the scope of this disclosure.

High-frequency rotational oscillations caused by a drill string drilling a borehole may be localized below a motor of the drill string. Because there typically is no suitable measurement instrumentation disposed below the motor, these oscillations may be difficult to detect directly. The presently disclosed systems and methods may indirectly determine, analyze, and/or quantify the oscillations by determining the axial vibration generated by the effect of the rotational oscillations on the cutting action of the bit of the drill string. The axial vibrations, which may not be localized below the motor, may be detected using accelerometers, strain gauges, or other suitable instrumentation above the motor.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

In embodiments, a tangible, non-transitory, computer-readable medium may store instructions executable by one or more processors, in which the instructions may cause the one or more processors to determine a threshold value associated with an axial acceleration oscillation amplitude at a drill bit that is part of a drilling system. The instructions further may cause the one or more processors to receive an operating parameter value of the drilling system, compare the operating parameter value with the threshold value, and adjust an operation of the drilling system in response to comparing the operating parameter value with the threshold value.

In embodiments, a drilling system may include a drill string having a drill bit, in which the drill string may rotate and drive the drill bit to engage the drill bit with a borehole. The drilling system may also include a sensor that may detect an operating parameter value of the drilling system, and a control system communicatively coupled to the drilling system. The control system may include a threshold determination engine that may determine a threshold value associated with an axial acceleration oscillation amplitude at the drill bit, a processor, and a memory device that may store instructions. The instructions may cause the processor to receive an operating parameter value detected by the sensor, compare the operating parameter value with the threshold value, and adjust an operation of the drilling system in response to comparing the operating parameter value with the threshold value.

In embodiments, a method of the present disclosure may include determining a threshold value associated with an axial acceleration oscillation amplitude at a drill bit that is part of a drilling system, receiving an operating parameter value detected at a detection location of the drilling system, comparing the operating parameter value with the threshold value, and adjusting an operation of the drilling system in response to comparing the operating parameter value with the threshold value.

BRIEF DESCRIPTION OF THE DRAWINGS

Various aspects of this disclosure may be better understood upon reading the following detailed description and upon reference to the drawings, in which.

DETAILED DESCRIPTION

Figure 1:
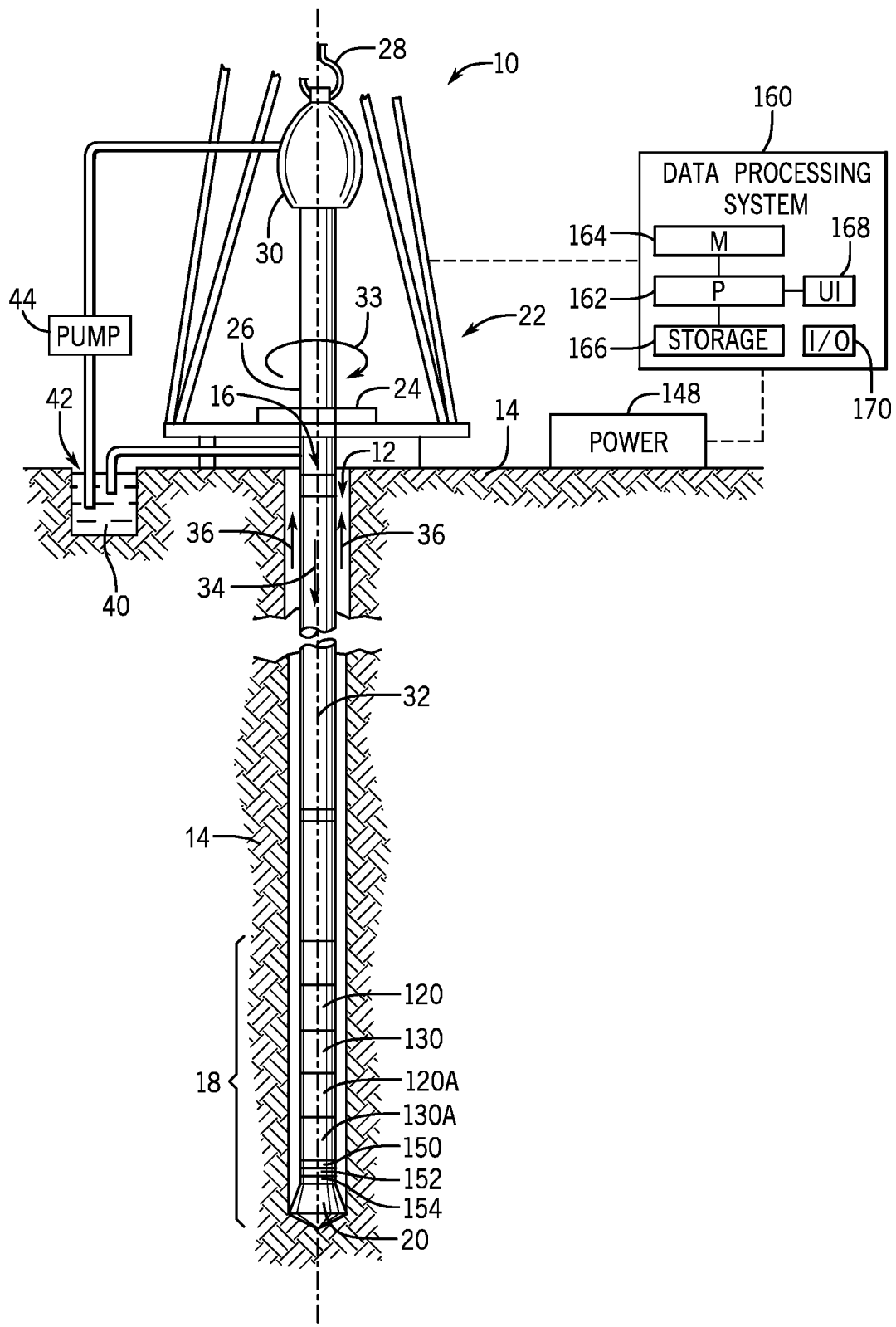
FIG. 1 is a schematic diagram of a drilling system having a drill string, according to an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to a drilling system that uses a drill string to form a subterranean borehole, for example for the exploration and/or production of natural resources (e.g., oil, gas, water). The drilling system may rotate the drill string and drive the drill string to form the borehole. That is, the drilling system may operate the drill string to engage a drill bit of the drill string with subsurface geological formations. During operation of the drilling system, movement of the drill string may be determined and used to regulate operation of the drilling system. As an example, during operation of the drilling system, a part of the drill string may vibrate or oscillate due to, for example, rotation of the drill string, engagement of the drill string with the geological formation, interaction of components of the drill string, interaction with a drilling fluid directed to the drill string, and so forth. The vibrations or oscillations of the drill string may be determined while the drill string is operated. In general, vibrations or oscillations are rapid and repeated movement (e.g., movement in a cyclic manner). By way of example, such movement may include radial oscillations, axial oscillations, and/or rotational oscillations, which will be further described herein.

In some cases, such oscillations may negatively impact performance of the drilling system. For example, using conventional systems, in general the presence of relatively high frequency (e.g., above 50 Hertz) rotational oscillations at the drill bit may affect structural integrity of the drill string and/or limit performance of the drill string. However, detecting characteristics of rotational oscillations at the drill bit may be difficult. In particular, the drill string may include a motor that drives the drill bit. However, the motor may be positioned adjacent to the drill bit, and, as such, isolate some movement of the drill bit from movement of a remainder of the drill string above the motor. That is, during operation of the drilling system, the drill bit moves relative to the remainder of the drill string. Thus, rotational oscillation of the drill string detected above the motor may not accurately reflect rotational oscillation of the drill bit (which is located below the motor).

Furthermore, via conventional approaches, movement of the drill bit may not be effectively detected, and/or information detected at the drill bit may not be effectively transmitted elsewhere in the drilling system. For example, as the drill bit may rotate at a different rate than the remainder of the drill string, the drill bit may not be wired to communicatively couple the drill bit with the remainder of the drill string. Additionally or alternatively, it may be impractical to monitor rotational oscillations, such as when costs of implementing components to detect rotational oscillations are prohibitively high. As a result, the presence of high frequency oscillation at the drill bit may not be easily detected.

Thus, in accordance with the present disclosure, determining rotational oscillation at the drill bit based on detectable operating parameters may indirectly enable determining the presence of high frequency oscillation at the drill bit. Generally, rotational oscillations at the drill bit are coupled to axial motion of the drill string, which may be more easily detected than rotational oscillation. As such, axial motion, such as axial acceleration oscillation, of the drill string may be detected and used to determine rotational oscillation of the drill bit. Moreover, while the above example focuses on analysis of frequency of rotational oscillation, other characteristics, such as amplitude of rotational oscillation, may additionally or alternatively be analyzed.

In certain embodiments, it may be determined, via simulation and/or historical measurement data, that an amplitude or range of amplitudes of axial acceleration oscillation corresponds to a presence of rotational oscillation having a particular frequency (e.g., a relatively high frequency, such as above 50 Hertz, associated with rotational oscillations at the drill bit that may affect structural integrity of the drill string and/or limit performance of the drill string). As an example, an operating parameter (e.g., axial acceleration) of the drill string may be detected via a sensor (e.g., an accelerometer or strain gauge) of the drill string. The operating parameter may be used to determine the amplitude of axial acceleration oscillation. The presence, severity, and/or other characteristics of rotational oscillation at the drill bit may then be inferred using the determined amplitude of axial acceleration oscillation.

Although this disclosure primarily discusses determining the presence of high frequency rotational oscillation at the drill bit, it should be understood that the presence of high frequency rotational oscillations at other locations of the drill string may be additionally or alternatively determined. In this manner, the operating parameter may be used to determine characteristics of rotational oscillation at any location along the drill string. In any case, operation of the drill string may be adjusted based on the determined rotational oscillation characteristic.

To help illustrate the techniques described herein, FIG. 1 shows an example embodiment of a drilling system 10 at a well site, in which the drilling system 10 may be used to form a borehole 12 (e.g., wellbore) through geological formations 14 that may be onshore or offshore. The drilling system 10 may include a drill string 16 suspended within the borehole 12 and the drilling system 10 may have a bottom hole assembly (BHA) 18 that includes a drill bit 20 at its lower end, in which the drill bit 20 engages the geological formations 14. In this disclosure, the drill bit 20 may include any cutting structure (e.g., a cutter, a reamer, and/or the like) that may be used to engage and cut the geological formations 14.

The drilling system 10 also includes a surface system 22 that provides rotation and drive to the drill string 16. In some embodiments, the drilling system 10 may include a kelly system having a rotary table 24, a kelly 26, a hook 28, and a rotary swivel 30. The drill string 16 may be coupled to the hook 28 through the kelly 26 and the rotary swivel 30. The rotary swivel 30 may be suspended from the hook 28 that is attached to a traveling block (not shown) that drives the drill string 16 relative to the surface system 22 along an axis 32 that extends through a center or an approximate center of the borehole 12. Furthermore, the rotary swivel 30 may permit rotation of the drill string 16 relative to the hook 28, and the rotary table 24 may rotate in a rotational direction 33 to drive the drill string 16 to rotate concentrically about the axis 32. Alternatively, the drilling system 10 may be a top drive system that rotates the drill string 16 via an internal drive (e.g., an internal motor) of the rotary swivel 30. That is, the drilling system 10 may not use the rotary table 24 and the kelly 26 to rotate the drill string 16. Rather, the internal drive of the rotary swivel 30 may drive the drill string 16 to rotate in the rotational direction 33 relative to the hook 28 concentrically about the axis 32.

In any case, as the surface system 22 rotates the drill string 16, the surface system 22 may further drive the drill string in axial directions to engage the drill string 16 with the geological formations 14. For example, the drill string 16 may be driven into the geological formation 14 through the borehole 12 in a first axial direction 34, which may be a generally vertical direction downwards. Additionally, the drill string 16 may be removed from the borehole 12 in a second axial direction 36 opposite the first axial direction 34. That is, the second axial direction 36 may be a generally vertical direction upwards. The combined axial and rotational movement of the drill string 16 may facilitate engagement of the drill string 16 with the geological formations 14. While vertical directions are depicted in the example of FIG. 1, it should be understood that a borehole may be extended by a drilling system 10 in a wide variety of directions and/or angles, including vertical, horizontal or lateral, and/or any other angle or orientation within the geological formations. For example, axis 32 may be vertical, horizontal, or angled, and may vary along the length of a borehole 12, and axial directions 34, 36 may be any pair of directions opposite to the other at a given depth.

The surface system 22 may also include mud or drilling fluid 40 that may be directed into the drill string 16 to cool and/or lubricate the drill bit 20. Additionally, the drilling fluid 40 may exert a mud pressure on the geological formations 14 to reduce likelihood of fluid from the geological formations 14 flowing into and/or out of the borehole 12. In some embodiments, the drilling fluid 40 may be stored in a pit 42 formed at the well site. A pump 44 may fluidly couple the pit 42 and the swivel 30, in which the pump 44 may deliver the drilling fluid 40 to the interior of the drill string 16 via a port in the swivel 30, causing the drilling fluid 40 to flow downwardly through the drill string 16 in the first axial direction 34. The drilling fluid 40 may also exit the drill string 16 via ports in the drill bit 20 and flow into the borehole 12 toward the surface (e.g., toward the surface system 22). While drilling, the drilling fluid 40 may circulate upwardly in the second axial direction 36 through an annulus region between the outside of the drill string 16 and a wall of the borehole 12, thereby carrying drill cuttings away from the bottom of the borehole 12. Once at the surface, the returned drilling fluid 40 may be filtered and conveyed back to the pit 42 for recirculation and reuse.

The BHA 18 of the exemplary drilling system 10 of FIG. 1 may include various downhole tools, such as a logging-while-drilling (LWD) module 120 and/or a measuring-while-drilling (MWD) module 130. Generally, the downhole tools may facilitate determining a performance of the drill string 16, such as by determining a parameter of the drill string 16, of the surrounding geological formation 14, and/or the like. It should also be appreciated that more than one LWD module 120 and/or MWD module 130 may be employed. For example, the BHA 18 may include an additional LWD module 120A and/or an additional MWD module 130A positioned adjacent to the drill bit 20. As such, references made to the LWD module 120 may also refer to the LWD module 120A, and references made to the MWD module 130 may also refer to the MWD module 130A, as well as to other such or similar module(s).

The LWD module 120 and/or the MWD module 130 may each be housed in a special type of drill collar and may contain one or more types of logging tools. In general, the LWD module 120 may include capabilities for measuring, processing, and storing information, and the MWD module may contain one or more devices for measuring characteristics of the drill string 16 and/or the drill bit 20, as well as for communicating with surface equipment (e.g., of a surface system 22). In the drilling system 10 of FIG. 1, the LWD module 120 and/or the MWD module 130 may include, for example, one or more of the following types of measuring devices: a weight-on-bit measuring device, a torque measuring device, a bend measuring device, a vibration measuring device, a shock measuring device, a stick-slip measuring device, a direction measuring device, and/or an inclination measuring device.

In certain embodiments, an MWD module 130 may also include an apparatus for generating electrical energy. For example, the MWD module 130 may include a mud turbine generator that generates electrical energy from the flow of the drilling fluid 40. In additional or alternative embodiments, the drilling system 10 may include a power source 148, such as an electrical generator and/or an electrical energy storage device, that supplies energy to the drilling system 10. In any case, electrical energy may be used to operate the aspects of the drilling system 10, such as to control the BHA 18.

The BHA 18 may further include a motor 150 and/or a rotary-steerable system (RSS) 152 that regulates operation of the drill bit 20 to engage with the geological formations 14. For example, the RSS 152 may orient the drill bit 20 in a desirable direction while the motor generates continuous rotation to engage the drill bit 20 to drill the borehole 12. As should be understood, generating continuous rotation may enable improved transportation of drilled cuttings to the surface, better cutting of the borehole 12, limited stress imparted upon the drill bit 20 by the geological formations 14, and so forth. Furthermore, the RSS 152 may enable control of the engagement of the drill string 16 with the geological formations 14. By way of example, the RSS may place the drill string 16 in communication with the surface system 22. As such, the surface system 22 may control a direction or path for the drill string 16 to form the borehole 12 and/or a manner the drill string 16 engages with the geological formations 14 (e.g., a rotation of the drill string 16). In certain embodiments, the drill string 16 may include additional tubulars 154 that couple the drill bit 20 with the motor 150 and/or the RSS 152.

In some embodiments, a data processing system 160 may be communicatively coupled to the drilling system 10. The data processing system 160 may be any electronic data processing system that may be used to carry out the systems and methods of the present disclosure. For example, the data processing system 160 may include one or more processors 162, for example a general-purpose microprocessor, an application specific processor (ASIC), and/or a field programmable logic array (FPGA). The one or more processors 162 may execute instructions stored in a memory 164 and/or a storage 166, which may be read-only memory (ROM), random-access memory (RAM), flash memory, an optical storage medium, a hard disk drive, and/or the like. For example, the instructions may be used to adjust an operation of the drilling system 10, including operation of the drill string 16.

In some embodiments, the data processing system 160 may also include a user interface 168 that may enable a user, e.g. a human user, a virtual user, a machine-based automated system, and/or the like, to interact with the data processing system 160. For example, the user may input properties and/or instructions (e.g., control commands) to the data processing system 160 via the user interface 168. In embodiments, a user interface 168 may include a button, a keyboard, a microphone, a mouse device, a trackpad, and/or the like. As will be appreciated, a user interface 168 also may include a display, which may be any suitable electronic display for visual representations of information, such as graphical representations of collected data.

Further still, the data processing system 160 may include input/output (I/O) ports 170 that enable the data processing system 160 to communicate with various electronic devices. For example, the I/O ports 170 may enable the data processing system 160 to directly couple to another electronic device (e.g., a mobile device) to enable data to transfer between the data processing system 160 and the electronic device. The I/O ports 170 may additionally or alternatively enable the data processing system 160 to indirectly couple to other electronic devices. In another example, the I/O ports 170 may enable the data processing system 160 to couple to a network, such as a personal area network (PAN), a local area network (LAN), and/or a wide area network (WAN). Accordingly, in some embodiments, the data processing system 160 may receive data (e.g., as signals) from another electronic device (e.g., a base-station control system) and/or communicate data to another electronic device via the I/O ports 170.

The data processing system 160 may be a local component of the drilling system 10 (e.g., within the BHA 18), a device located proximate to the drilling operation (e.g., at or near the surface system 22), and/or a remote data processing device located away from the drilling system 10, such as a mobile computing device (e.g., tablet, smart phone, laptop) or a server remote from the drilling system 10. In any case, the data processing system 160 may process downhole measurements in real time or sometime after the data has been collected. In general, the data processing system 160 may store and process collected data, such as data collected in the BHA 18 via LWD module(s) 120, MWD module(s) 130, and/or any suitable telemetry (e.g., electrical signals pulsed through the geological formations 14 or mud pulse telemetry using the drilling fluid 40).

Figure 2:
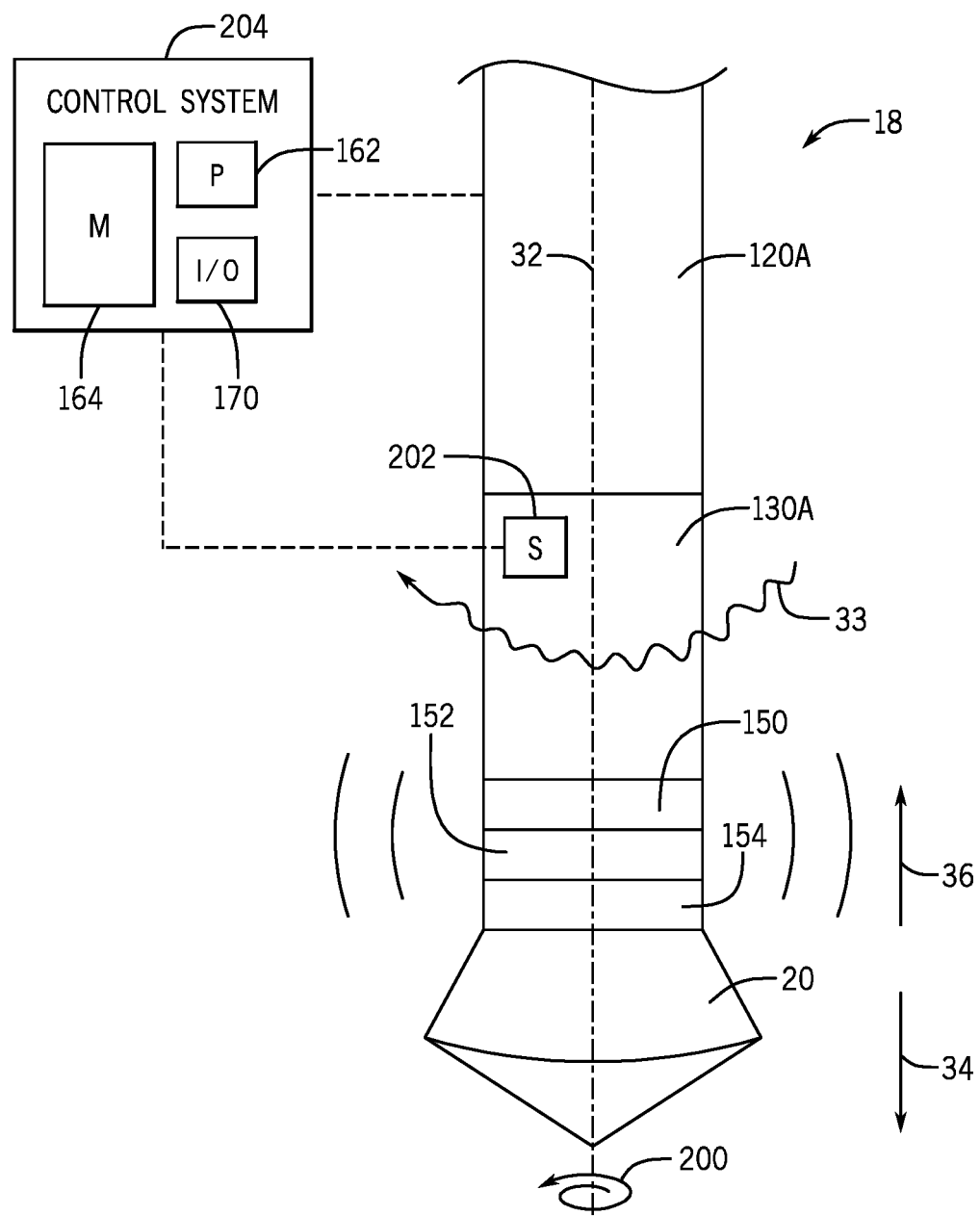
FIG. 2 is a partial view of a bottom hole assembly of the drilling system of FIG. 1, according to an embodiment of the present disclosure.

FIG. 2 is a magnified schematic view of a portion of the BHA 18 of the drilling system 10 of FIG. 1, according to embodiments of the present disclosure. When the drilling system 10 is in operation, the drill string 16 may be driven to move in the first and second axial directions 34, 36 along the axis 32, and the drill string 16 may also be driven to rotate concentrically in the rotational direction 33 about the axis 32. However, as should be understood, operation of the drill string 16 (e.g., the drill bit 20) may cause certain parts of the drill string 16 to unintentionally vibrate or oscillate. As an example, when the drilling system 10 is in operation, parts of the drill string 16 may rotationally oscillate, axially oscillate, and/or radially oscillate. For reference, axial oscillations refer to movement of the drill string 16 in the first and second axial directions 34, 36. Rotational oscillations refer to revolution of the drill string 16 about the axis 32, such as in a revolutional direction 200 around the axis 32. Radial oscillations refer to movement of the drill string 16 transverse or lateral to the axis 32. In other words, radial oscillations may cause the drill string 16 to deflect crosswise to the axis 32 and may be a mixture of rotational oscillation and lateral movement.

In general, it should be understood that any of the oscillatory motions described herein may include cycles of repeated displacement of the drill string 16. Thus, each oscillatory motion may include a respective amplitude, which is a maximum displacement of the drill string 16, and a respective frequency, which is a number of cycles of movement of the drill string 16 that take place in one second. Furthermore, the respective amplitudes and frequencies within a particular oscillatory motion may vary over time. For example, the oscillatory motion (e.g., axial oscillation) may vary based on an axial velocity or rate of penetration (ROP) of the drill bit 20 into the geological formations 14. The varying oscillatory motion may result in varying amplitudes and/or frequencies.

The illustrated embodiment of the BHA 18 may detect the vibrational and oscillatory movement of the drill bit 20. For example, the BHA 18 may include a sensor 202 that detects an operating parameter indicative of the oscillatory movement of the drill bit 20. In some embodiments, the sensor 202 may be an accelerometer (e.g., piezoelectric accelerometer) that detects acceleration of the drill string 16, such as in the first and second axial directions 34, 36. In additional or alternative embodiments, the sensor 202 may be a strain gauge that detects deformation (e.g., axial strain) of the drill string 16 and/or stress imparted on the drill string 16. In further embodiments, the sensor 202 may be a pressure sensor that detects pressure of fluid within the drill string 16, a radial accelerometer or strain gauge that detects bending movement (e.g., bending stress, bending strain) of the drill string 16, and/or another type of sensor.

The sensor 202 may be communicatively coupled to a control system 204 that processes and/or transmits the operating parameter detected by the sensor 202. The control system 204 may be a part of the data processing system 160, or the control system 204 may be a separate system communicatively coupled to the data processing system 160. In some embodiments, the sensor 202 may be part of an MWD module 130, and the control system 204 may be considered part of an LWD module 120. However, it should be appreciated that the sensor 202 and/or the control system 204 may be a component of other suitable parts of the drilling system 10. Indeed, the sensor 202 may be positioned external to the borehole 12 (e.g., at or near the surface system 22), may be a part of the motor 150, and so forth. In certain embodiments, multiple sensors 202 may be used, each of which may detect the operating parameter and/or other operating parameters. In such embodiments, multiple values of the operating parameter may be detected, and a representative value of the multiple values (e.g., a mathematical mean) may be used by the control system 204. In any case, the control system 204 may include the memory 164 that stores instructions to process information detected by the sensor 202 and/or may include the processor 162 that executes the instructions. In certain embodiments, the control system 204 also may include the I/O ports 170 to enable the control system 204 to communicatively couple to other electronic devices.

In a certain implementation, the motor 150 may cause movement of the drill bit 20 to be localized from a remainder of the drill string 16. For example, the motor 150 may dampen, intensify, or otherwise cause a discrepancy between movement in the remainder of the drill string 16 relative to the drill bit 20. In this manner, the operating parameter detected by the sensor 202 may not be directly representative of the behavior of the drill bit 20. Therefore, the control system 204 may process the operating parameter to infer behavior of the drill bit 20. For example, the control system 204 may infer, calculate, or otherwise associate the operating parameter detected by the sensor 202 with a presence of high frequency rotational oscillation at the drill bit 20. That is, the control system 204 may determine and set a particular threshold value associated with the operating parameter, in which the threshold value is indicative the presence of high frequency rotational oscillations. In other words, determining that the particular threshold value has been exceeded may indicate that high frequency rotational oscillation at the drill bit 20 is present. The inference, calculation, or association of the operating parameter with the high frequency rotational oscillation at the drill bit 20 and/or the threshold value may be determined via simulation, modeling, and/or identifying trends in historical data.

As will be appreciated, axial motion (e.g., axial oscillations) may be generated based on rotational oscillations. Thus, by determining such axial motion, properties of the rotational oscillations (e.g., amplitude of rotational oscillation) may be inferred. Since determining rotational oscillations via measurements or detections from sensors may be difficult and/or impractical, using characteristics of axial oscillations to infer or determine rotational oscillations may enable regulating operation of the drilling system 10 to limit a presence of high frequency rotational oscillations.

Figure 3:
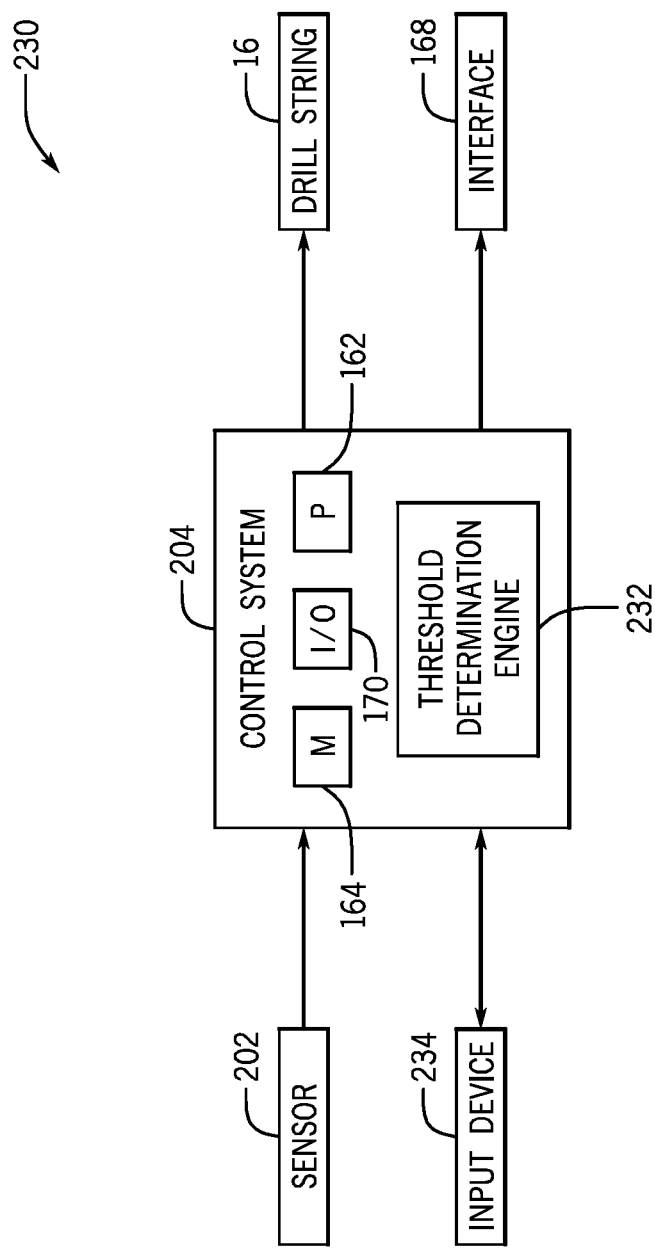
FIG. 3 is a schematic view of a computing system that processes an operating parameter of the drilling system of FIG. 1, according to an embodiment of the present disclosure.

FIG. 3 is a schematic view of a computing system, e.g. a rotational oscillation determination system 230, that may process an operating parameter of the drilling system 10, according to an embodiment of the present disclosure. As illustrated, the rotational oscillation determination system 230 includes the control system 204 that is communicatively coupled to the sensor 202. As such, the control system 204 may receive the detected operating parameter of the sensor 202 (e.g., an accelerometer or strain gauge). The control system 204, via the processor 162, may perform an operation in response to receiving the detected operating parameter, such as processing, storing, transmitting, and so forth, the received operating parameter, to determine or infer rotational motion of the drill string 16. In some embodiments, the processor 162 may perform the operation on a component of the drilling system 10 based on receiving the detected operating parameter. As an example, the control system 204 may further be communicatively coupled to the drill string 16. Based on the detected operating parameter and/or the determined rotational motion of the drill string 16, the control system 204 may adjust the rotation of the drill string 16, change a flow rate of drilling fluid 40 directed to the drill string 16, suspend operation of a component of the drill string 16, and so forth. In certain embodiments, the control system 204 may be communicatively coupled to the user interface 168 of the data processing system 160. As such, the control system 204 may transmit certain information to the data processing system 160 for use on the user interface 168. By way of example, the control system 204 may receive, analyze, and/or process the operating parameter and generate a visualization of based on the operating parameter, such as a graph that plots the detected operating parameter as the detected operating parameter changes over time. The user interface 168 may then display the generated graph to be viewed by a user.

In additional or alternative embodiments, the control system 204 may be communicatively coupled to other components. In one example, an input device 234 may be coupled to the control system 204, such as via the I/O port 170. The input device 234 may receive information (e.g., the detected operating parameter of the drilling system 10) from the control system 204, and/or the input device 234 may transmit information (e.g., a previously detected operating parameter of another drilling system 10) to the control system 204. The control system 204 may use the information transmitted by the input device 234 to adjust how the control system 204 may operate.

With continued reference to FIG. 3, the illustrated embodiment of the control system 204 also includes a threshold determination engine 232 that sets the particular threshold value associated with the operating parameter to indicate the presence of high frequency rotational oscillations at the drill bit 20. In certain embodiments, the threshold determination engine 232 may set the threshold value based on simulations, modeling, and/or historical trend data analysis of operating the drill string 16 to determine associated oscillation characteristics of the drill string 16. The simulations, modeling, and/or historical trend data analysis may establish the relationship between an axial acceleration oscillation amplitude at the drill bit 20 with a frequency of rotational oscillation at the drill bit 20. That is, an axial acceleration oscillation amplitude value at the drill bit 20 may be determined that corresponds to a rotational oscillation having a high frequency that is present at the drill bit 20. Based on the established relationship between the axial acceleration oscillation amplitude at the drill bit 20 and the presence of the high frequency rotational oscillation at the drill bit 20, the threshold determination engine 232 may set the threshold value to correspond to high frequency rotational oscillations at the drill bit 20. In other words, the threshold value set by the threshold determination engine 232 may be an axial acceleration oscillation amplitude value at the drill bit 20 corresponding to the presence of high frequency rotational oscillation at the drill bit 20.

As mentioned, rotational oscillations may be localized below the motor 150 and thus, measurements or detections of such rotational oscillations may be difficult. However, high frequency rotational oscillations may generate certain axial motions of the drill string 16 that may be detected or determined via the sensors 202 (e.g., a geostationary stabilized control collar of the RSS 152). That is, the operating parameter detected by the sensor 202 may be related to the axial motion of the drill string 16. Thus, by detecting such operating parameters, the control system 204 may determine that high frequency rotational oscillations are present.

As will be appreciated, the operating parameter detected by the sensor 202 may be associated with the axial acceleration oscillation amplitude at the drill bit 20. In other words, the sensor 202 may detect the operating parameter (e.g., axial acceleration, axial strain) of the drill string 16, and the control system 204 may determine (e.g., calculate) the corresponding axial acceleration oscillation amplitude at the drill bit 20 using the detected operating parameter. The control system 204 may then determine if high frequency rotation oscillations are present at the drill bit 20 using the axial acceleration oscillation amplitude at the drill bit 20.

For example, the control system 204 may approximately determine the axial acceleration oscillation amplitude at the location or position of the sensor 202 (i.e., the detection or measurement position) by determining a root mean squared (RMS) of the axial acceleration at the detection position (as detected by the sensor 202), as represented by the following Equation 1:

$$A_{sensor} \approx \sqrt{2[(a\bar{a})^2]} \qquad \text{Equation 1}$$

in which $A_{sensor}$ is the axial acceleration oscillation amplitude at the detection position in gravitational acceleration (g), a is the axial acceleration detected via the sensor 202 at the detection position in g, and $\bar{a}$ is the mean of the axial acceleration detected via the sensor 202 at the detection position in g over a certain period of time. In additional or alternative embodiments, rather than using Equation 1, the value of $A_{sensor}$ may be determined via other methods, such as via peak-to-peak calculations of detected axial acceleration values, a rainflow counting algorithm, and/or the like.

In certain embodiments, the axial acceleration oscillation amplitude at the detection position (e.g., which may be determined via the operating parameter detected by the sensor 202) may be slightly different than the axial acceleration oscillation amplitude at the drill bit 20 (e.g., which may be used to predict the presence of high frequency rotational oscillation at the drill bit 20). As a result, the control system 204 may convert the axial motion detected by the sensor 202 to determine axial motion at the drill bit 20. For instance, a conversion calculation or estimation may be performed based on additional simulation, modeling, historical trend data analysis, algorithmic calculation, or another suitable technique to establish a conversion ratio between the axial acceleration oscillation amplitude at the detection position and the axial acceleration oscillation amplitude at the drill bit 20. Equation 2 below represents a relationship between the axial acceleration oscillation amplitude at the detection position and the axial acceleration oscillation amplitude at the drill bit 20:

$$A_{bit} = R A_{sensor} \qquad \text{Equation 2}$$

in which $A_{bit}$ is the axial acceleration oscillation amplitude at the drill bit 20, $A_{sensor}$ is the axial acceleration oscillation amplitude determined via the operating parameter detected by the sensor 202, and R is the conversion ratio established by the additional simulation, modeling, historical trend data analysis, algorithmic calculation, or other suitable technique. The control system 204 may then use $A_{bit}$, as determined via Equation 2, to predict the presence of high frequency rotational oscillations, such as by comparing $A_{bit}$ to the threshold value set by the threshold determination engine 232.

If the sensor 202 detects axial acceleration (e.g., the sensor 202 is an accelerometer), the control system 204 may determine the presence of high frequency rotational oscillations by directly inserting the detected axial acceleration into Equations 1 and 2 to determine $A_{sensor}$ and $A_{bit}$. If the sensor 202 detects axial strain (e.g., the sensor 202 is a strain gauge), the control system 204 determine the presence of high frequency rotational oscillations by first determining an acceleration and/or velocity based on the detected axial strain and, subsequently, using the determined acceleration and/or velocity to calculate $A_{sensor}$ and $A_{bit}$. Additionally or alternatively, the control system 204 may determine the presence of high frequency rotational oscillations by converting the detected axial strain to axial stress, determining velocity based on the converted axial stress and an axial impedance of the drill string 16 at the detection position, and using the determined velocity to determine acceleration for calculating $A_{sensor}$ and $A_{bit}$ based on Equations 1 and 2.

In further embodiments, other types of sensors and/or operating parameters may be used to determine the presence of high frequency rotational oscillation at the drill bit 20. In one example, a pressure sensor may be implemented near the drill bit 20 to detect pressure of a fluid column inside the drill string 16 (e.g., at a location above the drill bit 20 and below the motor 150). Simulation may then be performed and/or historical trend data may be analyzed to establish a relationship between pressure and characteristics of rotational oscillations at the drill bit 20 (such as an amplitude of the rotational oscillation amplitude). The threshold determination engine 232 may then set the threshold based on the established relationship between the pressure and the characteristics of rotational oscillations at the drill bit 20. As an example, the threshold determination engine 232 may select a pressure value indicative of a presence of high frequency rotational oscillations at the drill bit 20. Further still, the BHA 18 may include sensors that detect radial oscillations, such as radially mounted accelerometers and/or strain gauges oriented to measure deflection of the drill string 16. Analysis via simulation and/or historical trends may then establish a relationship between the radial oscillations and the rotational oscillations at the drill bit 20, and the threshold determination engine 232 may set the threshold based on the radial oscillation (e.g., a frequency of radial oscillation).

As should be understood, the data detected by the sensor 202 may be filtered to improve an accuracy of the detected operating parameter. That is, the sensor 202 and/or the control system 204 may filter detected data that is not caused by vibrations of the drill string 16 during operation of the drilling system 10. As an example, the sensor 202 and/or the control system 204 may filter out data associated with movement of the drill string 16 caused by sources other than the drilling system 10, such as movement caused by gravity. To this end, the sensor 202 may apply a filter (e.g., band-pass filter) that discards data having a particular characteristic (e.g., low frequency data) associated with movement of the drill string 16 caused by sources other than the drilling system 10 while retaining data that does not have the particular characteristic (e.g., movement of the drill string 16 caused by the drilling system 10). Filtering out frequencies higher than those characteristic of rotational oscillations increases the sensitivity of the measurement (e.g., by removing high-frequency noise that are largely electronic in nature).

In certain embodiments, other parameters of oscillation of the drill string 16 may be determined. For example, the drill string 16 may have rotational oscillations of different frequencies (i.e., different modes of rotational oscillation), of which multiple modes may be considered high frequency rotational oscillation. The lowest frequency (i.e., lowest mode) of existing the high frequency rotational oscillations of the drill string 16, and the corresponding motion in an axial and/or radial direction provoked by the high frequency rotational oscillation, may generally be represented by the following Equation 3:

$$f = 2L/c \qquad \text{Equation 3}$$

in which f is the frequency of the rotational oscillation in Hertz (Hz), L is the length of the tubulars 154 below the motors, and c is the speed of rotational waves, in which c is 3200 meters/second. The exact frequency of the axial acceleration oscillation may depend on a geometry of the drill string 16, such as a geometry of the motor 150 and/or components (e.g., the tubulars 154 below the motor 150). In general, the exact rotational frequency of the lowest mode will be below the rotational frequency f given by Equation 3. In certain embodiments, the frequency alternatively may be determined via simulation or modeling, incorporating detailed geometry information about the drill string 16 and the drill bit 20, in order to establish a more accurate value of the frequency. In further situations, the most significant mode of high frequency rotational oscillation is not that of the lowest mode, but of higher modes (e.g., frequencies of an integral multiple of the frequency at the lowest mode). As such, the high frequency rotational oscillation may have a frequency that is a multiple of the frequency f of Equation 3. In other words, the frequency f may be multiplied by an integer, n, to equate to the particular frequency of a different mode of high frequency rotational oscillation. In any case, such frequencies may be determined via simulation and/or modeling.

Furthermore, the rate of penetration may be determined by the following Equation 4:

$$ROP = A_{bit}/2\pi f \qquad \text{Equation 4}$$

in which ROP is the rate of penetration through the geological formations 14 in meters per second (m/s), f is the frequency of high frequency rotational oscillation when the rotational oscillations are at full amplitude, and $A_{bit}$ is the axial acceleration oscillation amplitude at the drill bit 20. The frequency f may be determined by measurement means, such as performing a Fourier Transform on data indicative of the axial acceleration oscillation and determining the frequency at which the amplitude of the transformed data is at a maximum. Additionally or alternatively, the frequency f may be determined by calculation via Equation 3. As such, the control system 204 may determine a rate at which the drilling system 10 is cutting the geological formations 14 based on the axial acceleration oscillation amplitude. For example, the ROP may represent an efficiency of the drilling system 10 to drill through the geological formations 14.

It should be understood that Equations 1-4 and/or the aforementioned simulations, modeling, or algorithms may be modified based on application of the particular drilling system 10. That is, certain variables of the Equation 1-4 may be adjusted, converted, corrected, and so forth, due to differences in geometry, components, physical characteristics, and/or operating characteristics of the drilling system 10. Additionally or alternatively, it should be understood that different simulations may be performed and/or historical trend data may be collected and/or analyzed for different types of drilling systems 10 to more accurately determine the relationship between variables of Equations 1-4. For example, a different relationship may exist between the behavior of axial oscillation and rotational oscillation based on a geometry of the drill string 16, components of the drilling system 10, an application of the drilling fluid 40 during operation of the drilling system 10, a characteristic (e.g., rigidity) of the geological formations 14, and so forth. Thus, various simulations may be performed and/or historical trend data may be collected and/or analyzed, and adjustments to Equations 1-4 or the results of Equations 1-4 may be made for more accurate results.

Figure 4:
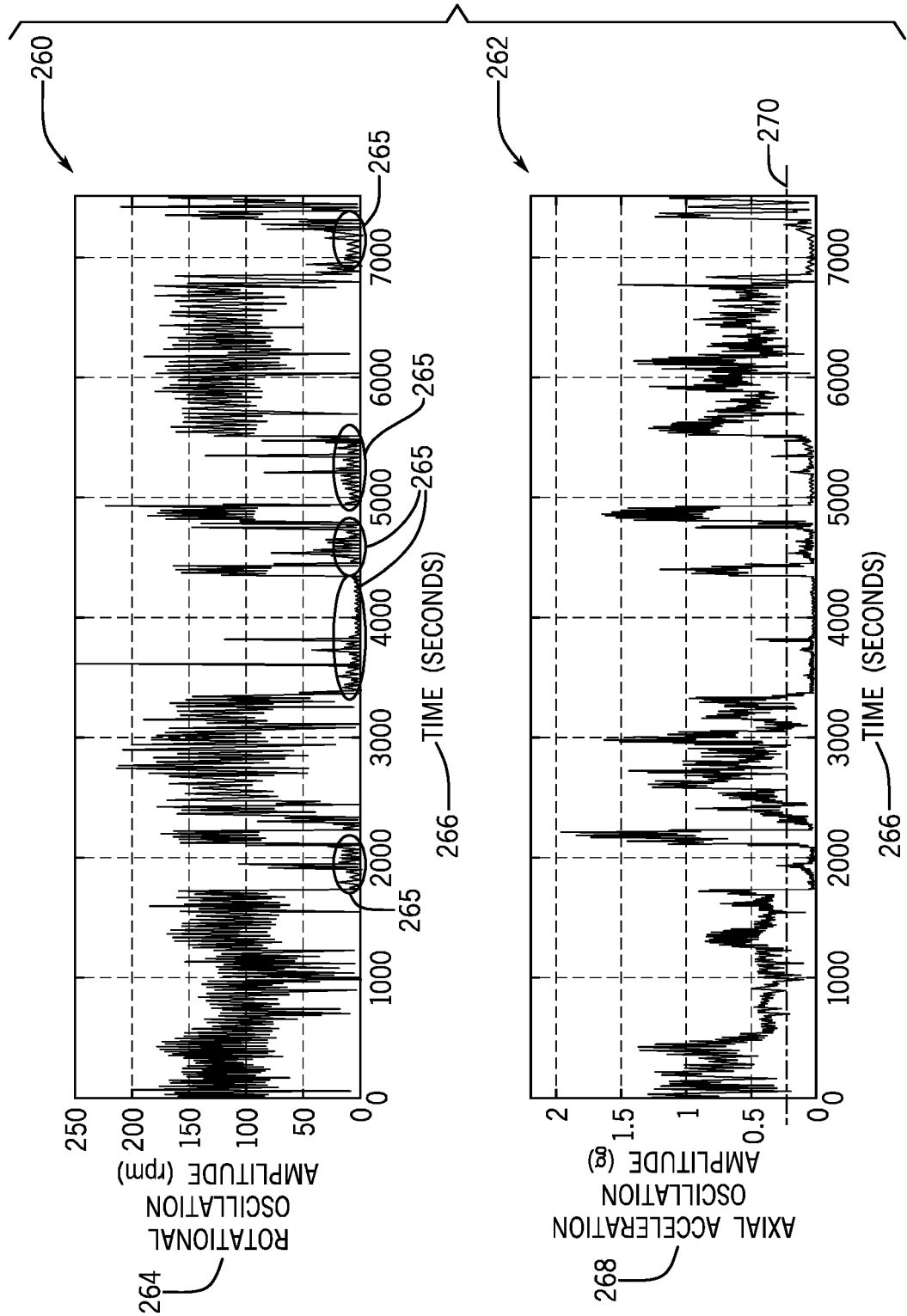
FIG. 4 shows graphs that each plot a respective oscillation parameter of the drilling system of FIG. 1 over a period of time, according to an embodiment of the present disclosure.

FIG. 4 shows a first example graph 260 and a second example graph 262 that plot a respective detected oscillation parameter of the drilling system 10 over a period of time, according to embodiments of the present disclosure. Particularly, the first graph 260 plots high frequency rotational oscillation amplitude 264 at the drill bit 20 in rotations per minute (rpm) over time 266 in seconds, and the second graph 262 plots axial acceleration oscillation amplitude 268 at the drill bit 20 in g over time 266. Particularly, the first graph 260 and the second graph 262 illustrate a certain value of axial acceleration oscillation amplitude is generated when high frequency oscillation amplitudes are present.

In some embodiments, the first graph 260 and the second graph 262 may be generated based on simulations, modeling, and/or historical trend data analysis associated with operation of the drill string 16. In one example, a first sensor and a second sensor may be positioned on a drill string 16 that does not have the motor 150 in order to reduce or eliminate movement at the drill bit 20 relative to a remainder of the drill string 16, which may be attributable to the motor 150. As such, detection of oscillation at the detection point of the drill string 16 may approximately correspond to detection of oscillation at the drill bit 20. The first sensor may detect rotational oscillation amplitude 264 of rotational oscillations having relatively high frequency (e.g., above 50 Hz) and generate the first graph 260. In the illustrated embodiment, the first sensor detects the rotational oscillation amplitude 264 of rotational oscillations of the drill string 16 having a frequency of 192 Hz, though it should be understood that the first sensor may detect the rotational oscillation amplitude 264 of rotational oscillations having any suitable frequency, such as 50 Hz, 100 Hz, 150 Hz, 200 Hz, and so forth. Concurrently, the second sensor may detect axial acceleration oscillation amplitude at the drill bit 20 to generate the second graph 262. As such, the detections of the first sensor in the first graph 260 may be compared with the detections of the second sensor in the second graph 262 for the period of time in which the first and second sensors are operated to determine a relationship between rotational oscillation amplitude 264 of rotational oscillations having relatively high frequency in the first graph 260 and axial acceleration oscillation amplitude at the drill bit 20 in the second graph 262. In additional or alternative embodiments, the first sensor may be, for example, disposed in the borehole 12 and detect rotational oscillation amplitude 264 of rotational oscillations of the drill string 16 having relatively high frequency.

Comparing the first graph 260 and the second graph 262, the axial acceleration oscillation amplitude 268 appears to coincide with the high frequency rotational oscillation amplitude 264. Generally, a presence of high frequency rotational oscillation amplitudes 264 indicates a presence of higher axial acceleration oscillation amplitudes 268. Moreover, when high frequency rotational oscillation amplitudes 264 are not present, the axial acceleration oscillation amplitudes 268 appear to be below a particular value. That is, as seen in the first graph 260, at certain times 265, the high frequency rotational oscillation amplitude 264 is relatively low (e.g., under 50 rpm) or approximately zero, indicating that high frequency rotational oscillation is minimal or not present. The second graph 262 may then be used to determine the axial acceleration oscillation amplitude value corresponding to the times when the high frequency rotational oscillation amplitude 264 is relatively low or approximately zero. In this particular example of the second graph 262, when the high frequency rotational oscillation amplitude 264 is relatively low or approximately zero at the times 265, the axial acceleration oscillation amplitude 268 is below about 0.25 g (as indicated by the dashed line 270).

In particular embodiments, the threshold determination engine 232 may set the threshold axial acceleration oscillation amplitude value based on graphs similar to the graphs 260, 262. That is, in the illustrated embodiment, the threshold determination engine 232 may set the threshold axial acceleration oscillation amplitude value at a particular value that is determined to correspond to the presence of high frequency rotational oscillations. In some embodiments, the threshold determination engine 232 may set the threshold value between a range, such as for example between 0.01 g to 1 g (e.g., 0.1 g, 0.2 g, 0.3 g), or any other suitable value or range of values of the axial acceleration oscillation amplitude 268 that corresponds to times when the high frequency rotational oscillation amplitude 264 is relatively low or approximately zero. In this manner, upon receiving an operating parameter value detected by a sensor 202, the control system 204 may convert (e.g., calculate) the operating parameter value to a corresponding axial acceleration oscillation amplitude value. Subsequently, the control system 204 may compare the corresponding axial acceleration oscillation amplitude value with the set threshold value to determine whether there is excessive high frequency rotational oscillation amplitude 264.

In additional or alternative embodiments, the threshold determination engine 232 may set the threshold value in terms of the operating parameter detected by the sensor 202. For example, the threshold determination engine 232 may determine (e.g., via Equations 1 and 2) an axial acceleration value, an axial or radial strain value, an axial or radial strain value, a pressure value, or any combination thereof (that is detectable by the sensor 202), that corresponds to the particular value of the operating parameter in which high frequency rotational oscillations are determined to be present. The threshold determination engine 232 may then set the threshold value as the determined operating parameter. In this manner, the control system 204 may compare operating parameter values detected by the sensor 202 to the threshold operating parameter value without having to convert the detected operating parameter values to axial acceleration oscillation amplitude values in order to determine the presence of high frequency rotational oscillations. Advantageously, not converting each detected operating parameter value to an axial acceleration oscillation amplitude value may save computing resources, such as processing power, memory, storage space, and/or communication bandwidth.

Figure 5:
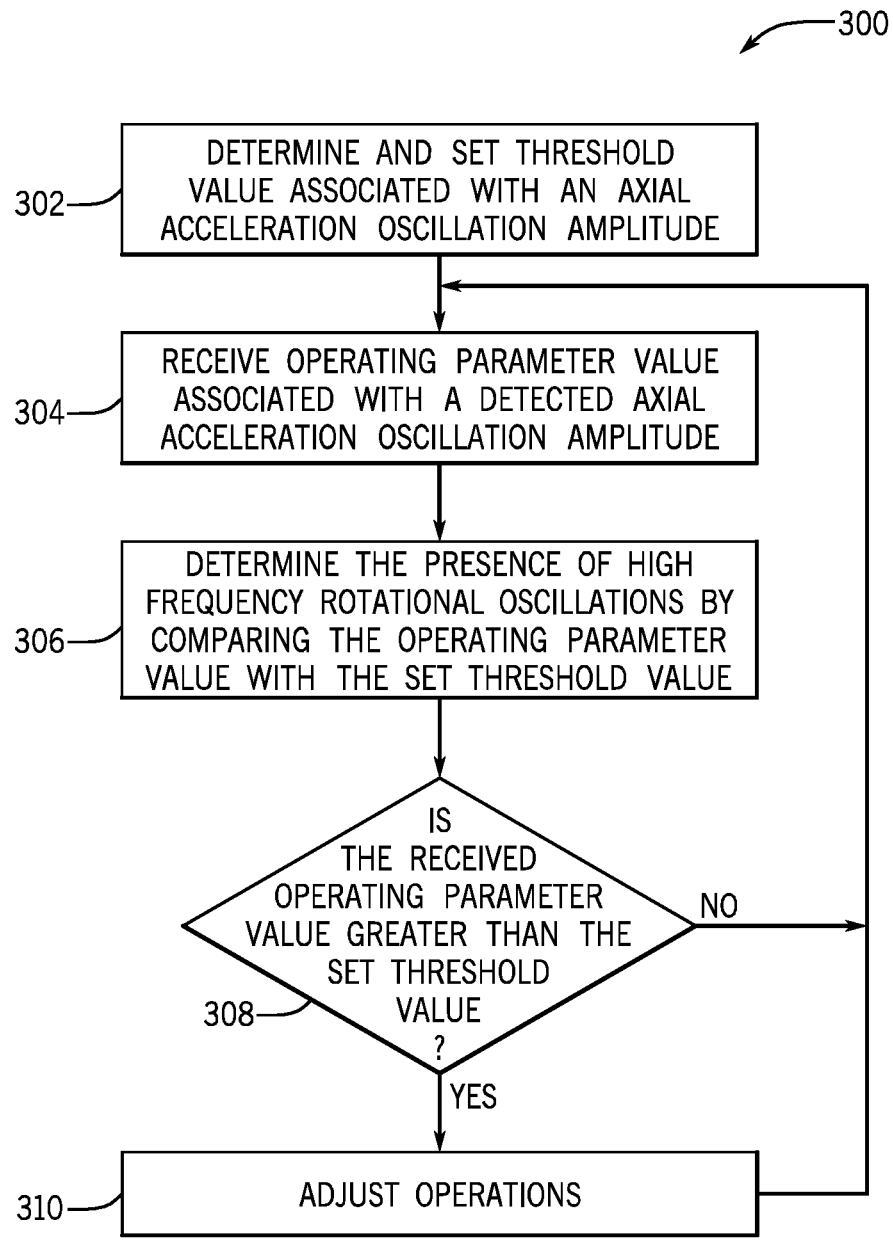
FIG. 5 is a flowchart representing a method that may be used to operate the drilling system of FIG. 1 while mitigating rotational oscillation of a drill string determined based on operating parameter values provided by sensor data, according to an embodiment of the present disclosure.

FIG. 5 a flowchart illustrating a method 300 that, in embodiments, may be used to operate the drilling system 10 while mitigating rotational oscillation of the drill string 16 determined based on operating parameter values provided by sensor data (e.g., provided by an accelerometer or strain gauge). As will be appreciated, the method 300 may be performed by the control system 204, the data processing system 160, or both. That is, instructions to perform the method 300 may be stored in the memory 164 and/or a storage device (e.g., the storage 166) of the control system 204 and/or the data processing system 160. Additionally or alternatively, the instructions to execute the method 300 may be stored in a separate electronic device, which may be communicatively coupled to the control system 204 (e.g., via the I/O ports 170). In any case, the processor 162 of the control system 204 and/or the processor 162 of the data processing system 160 may execute the instructions to perform the method 300.

At block 302, the processor 162 determines and sets a threshold value associated with the axial acceleration oscillation amplitude at the drill bit 20. As described herein, the processor 162 may determine the threshold value via simulation, modeling, and/or historical trend data analysis, and the threshold value may be set via the threshold determination engine 232. In some embodiments, the threshold may be automatically determined by the threshold determination engine 232. For example, the threshold determination engine 232 may analyze the simulation results, the modeling results, and/or the historical trend data (e.g., analyze the first graph 260 and the second graph 262) to determine and set a suitable threshold value. In additional or alternative embodiments, the threshold determination engine 232 may receive an input value (e.g., via user input), and set the threshold value based on the input value.

In some embodiments, the threshold value may be an axial acceleration oscillation amplitude value at the drill bit 20 at which the processor 162 determines high frequency rotational oscillations are present. That is, the threshold value may be an axial acceleration oscillation amplitude value represented by the dashed line 270 (e.g., 0.25 g) as depicted in the second graph 262 of FIG. 4. In additional or alternative embodiments, the threshold value may be an operating parameter value detected by the sensor 202, in which the operating parameter value corresponds to the axial acceleration oscillation amplitude value at the drill bit 20 at which high frequency rotational oscillations are determined to be present. That is, the threshold value may be in terms of axial acceleration, strain, and/or stress detected by the sensor 202, instead of in terms of the axial acceleration oscillation amplitude 268.

At block 304, the processor 162 receives an operating parameter value associated with axial acceleration oscillation amplitude at the drill bit 20. For example, the operating parameter value may be detected by and received from the sensor 202. That is, while the drilling system 10 is in operation, the sensor 202 may detect the operating parameter value and send the operating parameter value to the processor 162. For example, the operating parameter may be an axial acceleration, strain, and/or stress, each of which may be associated with the detected axial acceleration oscillation amplitude at the drill bit 20 while the drilling system 10 is in operation.

At block 306, the processor 162 determines if high frequency rotational oscillations are present by comparing the received operating parameter value associated with axial acceleration oscillation amplitude at the drill bit 20 to the threshold value set at block 302. If the threshold value is in terms of the axial acceleration oscillation amplitude at the drill bit 20, the processor 162 may convert the received operating parameter value (e.g., via Equations 1 and 2) to the corresponding axial acceleration oscillation amplitude value at the drill bit 20. Subsequently, the processor 162 may compare the corresponding axial acceleration oscillation amplitude value at the drill bit 20 to the threshold axial acceleration oscillation amplitude value at the drill bit 20. If the threshold value is in terms of the operating parameter (e.g., axial acceleration, strain, or stress), then the processor 162 may directly compare the received operating parameter value detected by the sensor 202 to the threshold operating parameter value.

At decision block 308, the processor 162 determines whether high frequency rotational oscillations are present based on if the received operating parameter value is greater than the set threshold value. If the processor 162 determines that high frequency rotational oscillations are not present (e.g., the received operating parameter value is not greater than the set threshold value), the processor 162 may not adjust operation of the drilling system 10. As long as the processor 162 determines that high frequency rotational oscillations are not present, the processor 162 may repeat blocks 304-308, in which the sensor 202 continues to detect operating parameter values associated with the axial acceleration oscillation amplitude at the drill bit 20, and the processor 162 continues to compare such operating parameter values to the set threshold value.

At block 310, in response to determining that high frequency rotational oscillations are present (e.g., the received operating parameter value is greater than the set threshold value) in decision block 308, the processor 162 adjusts operation of the drilling system 10. In certain embodiments, the processor 162 may adjust the operation of the drilling system 10 in response to a single determination that the received operating parameter value is greater than the set threshold value. In other words, once the received operating parameter value is determined to exceed the set threshold value, the processor 162 may adjust operation of the drilling system 10. In additional or alternative embodiments, the processor 162 may adjust operation of the drilling system 10 in response to determining that the received operating parameter value exceeds the set threshold value a certain number of instances in a period of time. In further embodiments, the processor 162 may adjust operation of the drilling system 10 if an average value of the received operating parameter value over a period of time exceeds the set threshold value. Further still, the received operating parameter value may be used in conjunction with other information (e.g., a fatigue model to infer twist angle and torque cycles) to determine additional operating data (e.g., a remaining fatigue life of a component or section of the drill string 16). The processor 162 may then adjust operation of the drilling system 10 based on the determined additional operating data.

In any case, adjusting the operation of the drilling system 10 may include, for example, adjusting a flow rate of drilling fluid 40, a rate at which the drill string 16 is rotated, a rate at which the drill string 16 is driven along the axis 32, and/or another operation of the drilling system 10 (e.g., by the processor 162 or any other suitable controller, control system, or processing system or device). In embodiments, the operation of the drilling system 10 may be adjusted based on characteristics of the received operating parameter value, such as an amount that the received data exceeds the set threshold value.

After adjusting the operation of the drilling system 10, the processor 162 may perform blocks 304-308 again to determine if high frequency rotational oscillations are still present, in which case the processor 162 may further adjust the operation of the drilling system 10. In some embodiments, after the operation of the drilling system 10 is adjusted, a certain amount of time may pass before further adjustment of the operation of the drilling system 10 is performed. That is, operation of the drilling system 10 may be permitted to reach an equilibrium performance state before the processor 162 determines if high frequency rotational oscillations are present and if further adjustment to the operation of the drilling system 10 is to be made.

It should be appreciated that the method 300 may include steps not mentioned in this disclosure. That is, steps may be performed prior to performing the steps at block 302, after performing the steps at block 310, or intermediate to any of the steps in the method 300. For example, after the operation of the drilling system 10 is adjusted upon determining the received operating parameter value is greater than the set threshold value, the processor 162 may also determine other operating conditions of the drilling system 10 (e.g., a rotational speed of the drill string 16 or a weight applied onto the traveler's block to drive the drill string 16). In this manner, the processor 162 may flag such operating conditions as being associated with times that the received operating parameter value is greater than the set threshold value. The processor 162 may then avoid such operating conditions in subsequent drilling operations, and thus, limit an occurrence of high frequency rotational oscillation when operating the drilling system 10. In a further example, the processor 162 may use the received operating parameter value for subsequent determinations of the threshold value set at block 302 of the drilling system 10 or other drilling systems 10.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, computer-readable medium that stores instructions executable by one or more processors, wherein the instructions are configured to cause the one or more processors to:
   receive an operating parameter value detected at a detection location and a threshold axial acceleration value associated with an axial acceleration oscillation amplitude at a drill bit, wherein the drill bit is a part of a drilling system;
   convert the operating parameter value into a corresponding axial acceleration oscillation amplitude at the detection location value of the drilling system;
   convert the corresponding axial acceleration oscillation amplitude at the detection location into the axial acceleration oscillation amplitude at the drill bit;
   compare the axial acceleration oscillation amplitude at the drill bit with the threshold axial acceleration value;
   from the comparing of the axial acceleration oscillation amplitude at the drill bit with the threshold axial acceleration value, determine a presence of high frequency rotational oscillations occurring in the drilling system while drilling; and
   adjust an operation of the drilling system, while drilling, in response to determining the presence of high frequency rotational oscillations occurring in the drilling system.

2. The tangible, non-transitory, computer-readable medium of claim 1, wherein determining the presence of high frequency rotational oscillations occurring in the drilling system indicates a presence of high frequency rotational oscillation at the drill bit.

3. The tangible, non-transitory, computer-readable medium of claim 2, wherein the high frequency rotational oscillation at the drill bit corresponds to rotational oscillation having a frequency of greater than 50 Hz.

4. The tangible, non-transitory, computer-readable medium of claim 1, wherein the threshold axial acceleration value is determined via simulation, modeling, historical trend data analysis, a user input, or any combination thereof.

5. The tangible, non-transitory, computer-readable medium of claim 1, wherein the operating parameter value comprising comprises an acceleration value, a strain value, a stress value, a pressure value, a prior operating parameter value associated with radial oscillation, or any combination thereof, detected at the detection location of the drilling system.

6. The tangible, non-transitory, computer-readable medium of claim 1, wherein adjusting the operation of the drilling system comprises adjusting a flow rate of drilling fluid directed to the drill bit, a rate at which the drill bit is rotated, a rate at which the drill bit is driven, or any combination thereof.

7. The tangible, non-transitory, computer-readable medium of claim 1, wherein adjusting the operation of the drilling system is in response to determining the corresponding axial acceleration oscillation amplitude at the drill bit exceeds the threshold axial acceleration value, determining the corresponding axial acceleration oscillation amplitude at the drill bit exceeds the threshold axial acceleration value a number of instances over a period of time, determining an average value of a plurality of corresponding axial acceleration oscillation amplitude at the drill bit over another period of time exceeds the threshold axial acceleration value, or any combination thereof.

8. The tangible, non-transitory, computer-readable medium of claim 1, wherein the threshold axial acceleration value is indicative of a value of the axial acceleration oscillation amplitude at the drill bit of 0.1 g to 0.5 g.

9. The tangible, non-transitory, computer-readable medium of claim 1, wherein the operating parameter value comprises a pressure value detected at the detection location of the drilling system.

10. A drilling system, comprising:
a drill string comprising a drill bit, wherein the drill string is configured to rotate and drive the drill bit to engage the drill bit with a borehole;
a sensor configured to detect an operating parameter value of the drilling system at a detection location of the drill string; and
a control system communicatively coupled to the drill system, wherein the control system comprises:
a threshold determination engine configured to determine a threshold value associated with an axial acceleration oscillation amplitude at the drill bit;
a processor; and
a memory device configured to store instructions, the instructions configured to cause the processor to:
receive the operating parameter value detected by the sensor while drilling;
convert the operating parameter value into a first axial acceleration oscillation amplitude at the detection location in response to receiving the operating parameter value;
convert the first axial acceleration oscillation amplitude at the detection location into the axial acceleration oscillation amplitude at the drill bit;
compare the axial acceleration oscillation amplitude at the drill bit with the threshold value;
determine from comparing the axial acceleration oscillation amplitude at the drill bit with the threshold value that axial acceleration oscillation at the drill bit indicates a presence of high frequency rotational oscillation; and
adjust an operation of the drilling system, while drilling, in response to determining the axial acceleration oscillation at the drill bit indicates the presence of high frequency rotational oscillation.

11. The drilling system of claim 10, wherein the drill string comprises a motor configured to orient the drill bit in a desirable direction and maintain a rotation of the drill bit during the operation of the drilling system, wherein the motor separates the drill bit from the detection location of the drill string.

12. The drilling system of claim 10, wherein the sensor is an comprises a strain gauge configured to detect an axial strain or a radial strain of the drill string or another strain gauge configured to detect an axial stress or a radial stress imparted onto the drill string.

13. The drilling system of claim 10, wherein the sensor comprises a filter configured to remove data having a particular frequency.

14. The drilling system of claim 10, wherein the sensor comprises a pressure sensor configured to detect a pressure imparted onto the drill string.

15. A method, comprising:
receiving a threshold value associated with an axial acceleration oscillation amplitude at a drill bit, wherein the drill bit is a part of a drilling system;
receiving an operating parameter value while drilling, wherein the operating parameter value is detected at a detection location of the drilling system;
converting the operating parameter value into an axial acceleration oscillation amplitude at the detection location in response to receiving the operating parameter value;
converting the axial acceleration oscillation amplitude at the detection location into a corresponding axial acceleration oscillation amplitude at the drill bit;
comparing the corresponding axial acceleration oscillation amplitude at the drill bit with the threshold value and thereby determining that axial acceleration oscillation at the drill bit indicates a presence of high frequency rotational oscillation in the drilling system; and
adjusting an operation of the drilling system, while drilling, in response to determining that axial acceleration oscillation at the drill bit indicates the presence of high frequency rotational oscillation in the drilling system.

16. The method of claim 15, further comprising determining the threshold value by simulating, modeling, or any combination thereof, and thereby determining an axial acceleration oscillation amplitude value at the drill bit corresponding to the presence of high frequency rotational oscillation at the drill bit in the drilling system.

17. The method of claim 15, wherein converting the axial acceleration oscillation amplitude at the detection location into the corresponding axial acceleration oscillation amplitude at the drill bit comprises multiplying the axial acceleration oscillation amplitude at the detection location by a conversion ratio, wherein the conversion ratio is determined via simulation, modeling, historical trend data analysis, algorithmic calculation, or any combination thereof.

18. The method of claim 15, wherein the operating parameter value is associated with an operating parameter of the drilling system, wherein the method comprises:
receiving an additional operating parameter value indicative of the operating parameter detected at the detection location of the drilling system;
converting the additional operating parameter value into an additional axial acceleration oscillation amplitude at the detection location in response to receiving the additional operating parameter value;
converting the additional axial acceleration oscillation amplitude at the detection location into an additional corresponding axial acceleration oscillation amplitude at the drill bit;

comparing the additional corresponding axial acceleration oscillation amplitude at the drill bit with the threshold value; and adjusting an additional operation of the drilling system in response to comparing the additional corresponding axial acceleration oscillation amplitude at the drill bit with the threshold value.

19. The method of claim 15, further comprising determining the threshold value by simulating, modeling, or any combination thereof, and thereby determining an axial acceleration oscillation amplitude value at the drill bit corresponding to the presence of high frequency rotational oscillation at the drill bit in the drilling system.

* * * * *